(12) United States Patent
Lu et al.

(10) Patent No.: US 11,797,646 B2
(45) Date of Patent: Oct. 24, 2023

(54) METHOD, ELECTRONIC DEVICE, AND COMPUTER PROGRAM PRODUCT FOR STANDARDIZING IMAGE ANNOTATION

(71) Applicant: Wistron Corp., New Taipei (TW)

(72) Inventors: Ting-Chieh Lu, New Taipei (TW); Ching Ming Chen, New Taipei (TW); Yun-Yuan Tsai, New Taipei (TW); Shi Xiang Chen, New Taipei (TW); Jia-Hong Zhang, New Taipei (TW)

(73) Assignee: WISTRON CORP, New Taipei (TW)

( * ) Notice: Subject to any disclaimer, the term of this patent is extended or adjusted under 35 U.S.C. 154(b) by 321 days.

(21) Appl. No.: 17/249,736

(22) Filed: Mar. 11, 2021

(65) Prior Publication Data
US 2022/0171993 A1 Jun. 2, 2022

(30) Foreign Application Priority Data
Nov. 30, 2020 (CN) .......................... 202011371754.X

(51) Int. Cl.
*G06T 7/00* (2017.01)
*G06F 18/214* (2023.01)
(Continued)

(52) U.S. Cl.
CPC .......... *G06F 18/214* (2023.01); *G06F 18/217* (2023.01); *G06F 18/40* (2023.01);
(Continued)

(58) Field of Classification Search
None
See application file for complete search history.

(56) References Cited

U.S. PATENT DOCUMENTS 5,544,256 A * 8/1996 Brecher .................. G06T 7/001
706/900
2012/0229618 A1* 9/2012 Urano ................... G06T 7/0004
348/92
(Continued)

FOREIGN PATENT DOCUMENTS

TW M573475 U 1/2019
TW 202009791 A 3/2020
(Continued)

OTHER PUBLICATIONS

Chinese Language Office Action issued by TIPO dated Nov. 10, 2021 in the corresponding application TW 109143375.
(Continued)

*Primary Examiner* — Vikkram Bali
(74) *Attorney, Agent, or Firm* — McClure, Qualey & Rodack, LLP

(57) ABSTRACT

A method for standardizing image annotation includes receiving a defect pattern; marking an image according to the defect pattern to generate a first judgement result; marking the image according to the defect pattern to generate a second judgement result; comparing the first judgement result and the second judgement result to obtain a comparison result; and updating the defect pattern according to the comparison result to standardize the defect pattern. The method for standardizing image annotation of the present specification can improve the marking stability of the training data of a trained image recognition algorithm, thereby improving the accuracy of image recognition of the trained image recognition algorithm.

10 Claims, 11 Drawing Sheets

(51) Int. Cl.
  *G06N 3/08* (2023.01)
  *G06F 18/40* (2023.01)
  *G06F 18/21* (2023.01)
(52) U.S. Cl.
  CPC ............ *G06N 3/08* (2013.01); *G06T 7/0004* (2013.01); *G06T 2200/24* (2013.01); *G06T 2207/20081* (2013.01); *G06T 2207/20084* (2013.01); *G06T 2207/30164* (2013.01)

(56) References Cited

U.S. PATENT DOCUMENTS

| | | | | |
|---|---|---|---|---|
| 2017/0344695 | A1* | 11/2017 | Uppaluri | G03F 7/7065 |
| 2020/0003828 | A1* | 1/2020 | Ambikapathi | G06F 18/24765 |
| 2020/0005449 | A1* | 1/2020 | Ambikapathi | G06V 10/764 |
| 2020/0050955 | A1 | 2/2020 | Chiang et al. | |

FOREIGN PATENT DOCUMENTS

| | | |
|---|---|---|
| TW | M604031 U | 11/2020 |
| WO | 2020/029682 A1 | 2/2020 |

OTHER PUBLICATIONS

Indian language office action dated Dec. 6, 2022, issued in application No. IN 202124024337.

English language translation of office action dated Dec. 6, 2022, issued in application No. IN 202124024337 (included in attachment).

* cited by examiner

| test station | defect description | machine error code | specification error code | whether to re-judge or not? | testing window |
|---|---|---|---|---|---|
| AOI | 1. surface flatness | FP Flatness | FP Flatness | N | |
| | 2. poor link bar gap | Link Bar Gap | Link Bar Gap | N | |
| | 3. pin missing | SC Pin Missing | SC Pin Missing | Y | PIN-MISSING2<br>PIN-MISSING3<br>PIN-MISSING1<br>PIN-MISSING6<br>PIN-MISSING5<br>PIN-MISSING8<br>PIN-MISSING4<br>PIN-MISSING7<br>PIN-MISSING10<br>PIN-MISSING9 |
| | 4. hook deformation | FP Hook deformation | FP Hook deformation | Y | FP_DEFORMATION2<br>FP_DEFORMATION3<br>FP_DEFORMATION<br>FP_DEFORMATION4<br>FP_DEFORMATION5<br>FP_DEFORMATION6<br>FP_WARP2<br>FP_WARP3<br>FP_WARP4<br>FP_WARP5<br>FP_WARP1<br>FP_WARP |
| | 5. hook broken | Hook Broken | Hook Broken | Y | HK-BROKEN1<br>HK-BROKEN4<br>HK-BROKEN2<br>HK-BROKEN5<br>HK-BROKEN3<br>HK-BROKEN7<br>HK-BROKEN6 |

FIG. 8A

| | | | | |
|---|---|---|---|---|
| 6. snap broken | Snap Broken | Snap Broken | Y | SNAP-BROKEN4<br>SNAP-BROKEN1<br>SNAP-BROKEN2<br>SNAP-BROKEN3<br>SNAP-BROKEN6<br>SNAP-BROKEN<br>SNAP-BROKEN5<br>SNAP-BROKEN7 |
| 7. poor link bar width | Link Bar Width Fail | Link Bar Width Fail | Y | LINK_BAR_WIDTH_RB<br>LINK_BAR_WIDTH_LT<br>LINK_BAR_WIDTH_LB<br>LINK_BAR_WIDTH_RT<br>LINK_BAR_WIDTH_1<br>LINK_BAR_WIDTH_2 |
| 8. hook not engaged | Hook not engaged | Hook not engaged | Y | HOOK NOT ENGAGE2<br>HOOK NOT ENGAGE3<br>HOOK NOT ENGAGE1<br>HOOK NOT ENGAGE4<br>HOOK NOT ENGAGE |
| 9. Snap not engaged | Snap not engaged | Snap not engaged | Y | SNAP NOT ENGAGE1<br>SNAP NOT ENGAGE2<br>SNAP NOT ENGAGE3<br>SNAP NOT ENGAGE |
| 10. missing link bar | Link Bar Missing | Link Bar Missing | Y | LINK_BAR_MISSING<br>LINK_BAR_MISSING1<br>LINK_BAR_MISSING2 |
| 11. pin broken | SC Pin Broken | SC Pin Broken | Y | PIN-BROKEN2<br>PIN-BROKEN<br>PIN-BROKEN3<br>SC-PIN-BROKEN<br>SC-PIN-BROKEN1 |
| 12. edges or holes broken and blocked | FP HOLE BKOKEN | FP HOLE BKOKEN | Y | HOLE BKOKEN |

FIG. 8B

METHOD, ELECTRONIC DEVICE, AND COMPUTER PROGRAM PRODUCT FOR STANDARDIZING IMAGE ANNOTATION

CROSS REFERENCE TO RELATED APPLICATIONS

This application claims priority to and the benefit of China Application No. 202011371754.X, filed on Nov. 30, 2020, the entirety of which is incorporated by reference herein.

FIELD OF THE INVENTION

The invention relates to an image annotation standardization method, especially one relating to an image annotation standardization method using a convolution neural network for image recognition.

DESCRIPTION OF THE RELATED ART

In the field of artificial intelligence machine-learning in existing industrial production, due to the division of specialization and the huge amounts of data, a professional marking technician performs data marking and R&D engineers perform training of the image recognition model. This confirms the recognition effect. The technicians on the production line then compare the marking results of the professional marking technician and the image recognition model. The purpose of the R&D engineers confirming the recognition effect is to confirm whether the image recognition model can successfully achieve knowledge transfer, so as to achieve the effect of replacing human thinking and decision-making.

Therefore, although existing artificial intelligence machine-learning is usually sufficient for its intended purposes, it is not completely satisfactory in every respect.

BRIEF SUMMARY OF THE INVENTION

In order to resolve the issue described above, an embodiment of the invention provides a method for standardizing image annotation. The method includes receiving a defect pattern; marking an image according to the defect pattern to generate a first judgement result; marking the image according to the defect pattern to generate a second judgement result; comparing the first judgement result and the second judgement result to obtain a comparison result; and updating the defect pattern according to the comparison result to standardize the defect pattern.

According to the method disclosed above, marking the image includes receiving a control signal from a user interface (UI); and marking the image as a defective image or a non-defective image according to the control signal, or removing the image according to the control signal.

According to the method disclosed above, marking the image further includes receiving the control signal from the user interface, and storing the image in a corresponding storage space according to the control signal.

According to the method disclosed above, generating the first judgement result includes receiving the first judgement result and a re-judgement result for the image according to the defect pattern at different points in time; marking the image according to the first judgement result when the re judgement result is the same as the first judgement result. The first judgement result records whether the image is a defective image or not.

According to the method disclosed above, the method further includes obtaining a specification version of the defect pattern. The specification version records the update date of the defect pattern.

According to the method disclosed above, generating the second judgement result includes generating an image recognition algorithm, which is trained using the image as training data; and determining whether the image is a defective image by using the image recognition algorithm to obtain the second judgement result.

According to the method disclosed above, the method further includes auditing a marking result; wherein auditing the marking result includes receiving a first audit result and a second audit result at different points in time; and determining a marking result is qualified when the ratio of the difference (moving rate) between the first audit result and the second audit result is less than a first threshold. The first audit result and the second audit result record the number of defective images or a non-defective images included in the same group of images at different points in time.

According to the method disclosed above, updating the specification version of the defect pattern includes increasing or decreasing the number of images corresponding to at least one defect pattern; or increasing or decreasing the number of types of defect patterns in a defect profile.

The present disclosure also discloses an electronic device for standardizing image annotation. The electronic device includes a user interface and a processor. The user interface is configured to receive a defect pattern, and to receive a first judgement result generated by marking an image according to the defect pattern. The processor is configured to receive the defect pattern and the first judgement result from the user interface, and to mark the image according to the defect pattern to generate a second judgement result. The processor compares the first judgement result and the second judgement result to obtain a comparison result. The processor updates the defect pattern according to the comparison result to standardize the defect pattern.

The present disclosure also discloses a computer program product for standardizing image annotation, suitable for a computer with a processor. The computer program product includes a first receiving instruction, a second receiving instruction, a judgement instruction, a comparison instruction, and an update instruction. The first receiving instruction is configured to enable the processor to receive a defect pattern. The second receiving instruction is configured to enable the processor to receive a first judgement result generated by marking an image according to the defect pattern. The judgement instruction is configured to enable the processor to mark the image according to the defect pattern to generate a second judgement result. The comparison instruction is configured to enable the processor to compare the first judgement result and the second judgement result to obtain a comparison result. The update instruction is configured to enable the processor to update the defect pattern according to the comparison result to standardize the defect pattern.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustra

FIG. 8A is a schematic diagram of defect patterns of the method for standardizing image annotation in accordance with some embodiments of the disclosure.

FIG. 8B is a schematic diagram of defect patterns of the method for standardizing image annotation in accordance with some embodiments of the disclosure.

DETAILED DESCRIPTION OF THE INVENTION

In any case, a person skilled in the art may realize that this disclosure can still be implemented without one or more details or with other methods. For other examples, well-known structures or operations are not listed in detail to avoid confusion of this disclosure. The present disclosure is not limited by the described behavior or sequence of events, for example, some behaviors may occur in a different sequence or occur simultaneously under other behaviors or events. In addition, not all described actions or events need to be executed in the same method as the existing disclosure.

A method for standardizing image annotation in some embodiments of the disclosure is applicable to multiple production lines that produce multiple products. In some embodiments, the multiple products may be electronic devices, such as a laptop, a smart mobile device, or a tablet. In the production lines, a plurality of automated optical inspection (AOI) equipment uses optical instruments to obtain the surface conditions of the finished or semi-finished products (for example, in the form of images), and then uses computer image processing technology to detect defects such as foreign objects or abnormal patterns. Since automatic optical inspection is a non-contact inspection, semi-finished products can be inspected in intermediate processes. In other words, the method for standardizing image annotation of the present disclosure uses images taken from AOI equipment for subsequent processing to achieve the purpose of marking the images as defective images or non-defective images.

Figure 1:
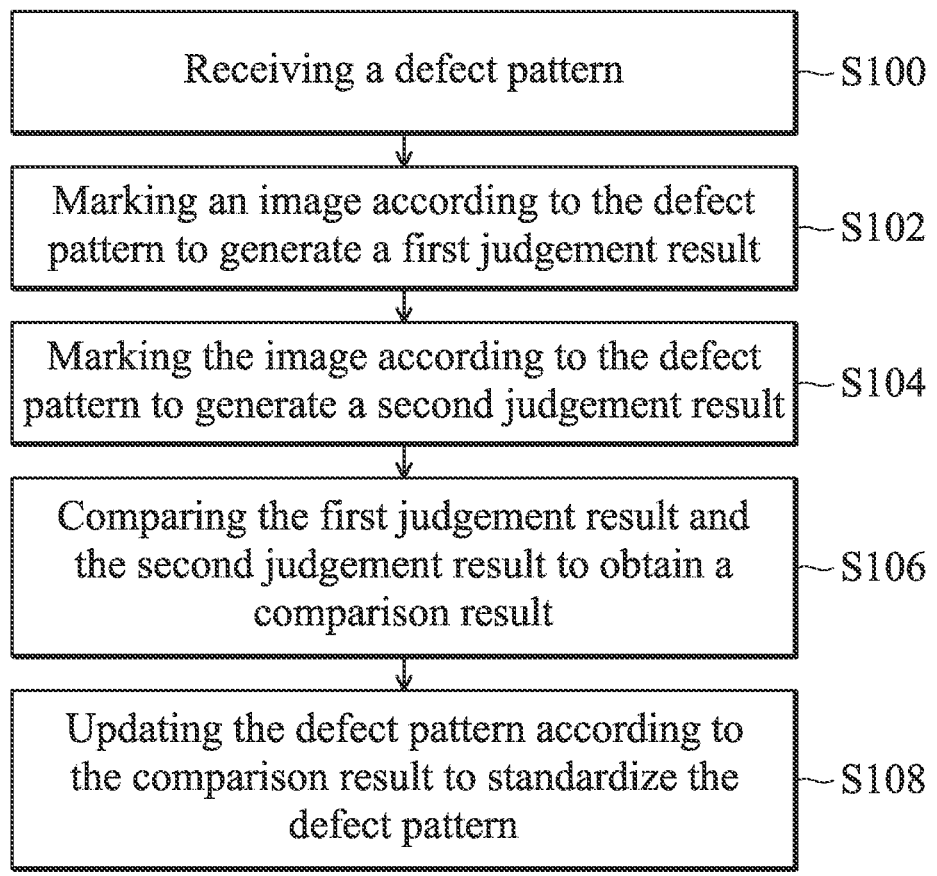
- FIG. 1 is a flow chart of a method for standardizing image annotation in accordance with some embodiments of the disclosure.

FIG. 1 is a flow chart of a method for standardizing image annotation in accordance with some embodiments of the disclosure. As shown in FIG. 1, the method for standardizing image annotation of the embodiment of the present disclosure first receives a defect profile. The defect profile defines a defect pattern of a defective image (step S100). In some embodiments, the method for standardizing image annotation of the embodiment of the present disclosure further obtains a specification version of the defect pattern. The specification version records the update date of the defect pattern. Then the method for standardizing image annotation of the embodiment of the present disclosure marks an image according to the detect pattern received in step S100 to generate a first judgement result (step S102). In detail, in step S102, the method for standardizing image annotation of the embodiment of the present disclosure receives the first judgement result and a re-judgement result for the image according to the defect pattern at different points in time. When the re-judgement result is the same as the first judgement result, the method of the present disclosure marks the image according to the first judgement result and the re-judgement result. The first judgement result records whether the image is a defective image or not. After that, the method for standardizing image annotation of the embodiment of the present disclosure marks the same image again according to the defect pattern received in step S100 to generate a second judgement result (step S104). In detail, in step S104, the method for standardizing image annotation of the embodiment of the present disclosure uses images as training data to generate a trained image recognition algorithm, and uses the image recognition algorithm to determine whether the image is a defective image, and obtains a second judgement result. Then the method for standardizing image annotation of the embodiment of the present disclosure compares the first judgement result obtained in step S102 and the second judgement result obtained in step S104 to obtain a comparison result (step S106). Finally, the method for standardizing image annotation of the embodiment of the present disclosure updates the defect pattern (for example, updates the specification version of the defect pattern) according to the comparison result (for example, the comparison result is that the second judgement result is different from the first judgement result) to redefine the defect pattern of the defective image to standardize the defect pattern (step S108).

In some embodiments, the defect pattern in the defect profile of the image in step S100 of FIG. 1 may include, for example, component skew, component broken, component missing parts, component empty welding, component displacement, foreign objects around the component, foreign objects blockage in the through hole, residual glue, lack of glue, glue overflow, misalignment of assembly . . . etc., but the present disclosure is not limited thereto. In some embodiments, the method for standardizing image annotation of the embodiment of the present disclosure may define different defect patterns according to different manufacturing processes in the production line. For example, the above-mentioned component skew, component broken, component missing parts, and component empty welding are common defects in the surface mount technology (SMT) process. The above-mentioned residual glue, lack of glue, glue overflow, misalignment of assembly are common defects in the assembly process. In some embodiments, in order to satisfy that the image recognition in step S108 can replace the original manual judgement after the image recognition is deployed on the production line. In step S100, the method for standardizing image annotation of the embodiment of the present disclosure is based on product defect definition and machine language logic to construct a complete data matrix. In some embodiments, the defect profile includes a plurality of defect patterns, and images corresponding to the defect patterns. For example, the defect profile records the defect patterns of component skew, component broken, and foreign objects around the component. The defect profile also records a plurality of images corresponding to component skew, a plurality of images corresponding to component broken, and a plurality of images corresponding to foreign objects around the component. In some embodiments, the defect profile includes a plurality of folders, each of the folders corresponds to a defect pattern, and each folder stores a plurality of images corresponding to the defect pattern.

For example, taking AOI as an example, if only one inspection frame code is used as the basis for classifying images, for example, an inspection frame code A indicates component skew, an inspection frame code B indicates component missing parts, and an inspection frame code C indicates foreign objects around the component. In practice, it is often found that the inspection frame code does not necessarily match the actual component defect, which causes the actual image to be inconsistent with the inspection frame code, and the image recognition algorithm in the subsequent step S108 cannot achieve the expected accuracy of image recognition. In some embodiments, the method for standardizing image annotation of the present disclosure combines the defect patterns of the product with product specification information to form a visual document (that is, a defect profile including various defect patterns and images corresponding to the various defect patterns), and is based on the above-mentioned visualization document as the basis for performing subsequent steps.

In some embodiments, the defect pattern in step S100 is stored in a defect profile. The defect profile records defect patterns of the product and product specification information. The product specification can be, for example, the acceptable range of component appearance length. In some embodiments, the defect profile further records a specification version of the defect pattern. For example, the defect profile records that a defect pattern A was added or updated in the defect profile at a time point a, and the defect pattern A was updated from the original version 1.2 to version 1.3 at the time point a, and a defect pattern B was added or updated in the defect profile at a time point b, and the defect pattern B was updated from the original version 2.0 to version 3.0 at the time point b. In some embodiments, the defect profile also records the storage location of each defect patterns in a storage space (such as a memory). In some embodiments, the defect pattern in step S100 is defined from the product images captured by the AOI equipment, but the present disclosure is not limited thereto. For example, the present disclosure can also define the defect pattern of the product from the images captured by any image capturing device.

In some embodiments, the method for standardizing image annotation of the embodiment of the present disclosure first obtains a specification version of the defect pattern after step S100. In other words, the defect profile further includes the specification version of the defect pattern. The specification records the update date or the import date of the defect pattern. For example, if the defect pattern of component skew is imported or updated in the defect profile on a first date, so in the defect profile, the defect pattern of component skew may be marked as "component skew (first date)". The specification version of the defect pattern in the defect profile can effectively control the import time of each defect pattern. When the second judgement result judged by the image recognition algorithm in step S106 is different from the first judgement result in step S102, the method of the present disclosure finds the image, corresponding to the defect pattern, that causes the first judgement result to be different from the second judgement result (that is, the training data of the image recognition algorithm), and it sets a new defect standard for images corresponding to the defect pattern. That is, it sets a new defect standard for the defect pattern to ultimately standardize the defect pattern.

In some embodiments, in step S102, the method for standardizing image annotation of the embodiment of the present disclosure further receives a first judgement result and a re-judgement result for the image according to the defect pattern at different points in time. In other words, the method of present disclosure further evaluates the consistency of the received first judgment result and the re-judgement result by step S102. In other words, the method of present disclosure further evaluates the marking ability of an object (for example, a computer or a person) that generates the first judgement result and the re-judgement result (according to the same defect standard). When the re judgement result is different from the first judgement result, the method for standardizing image annotation of the embodiment of the present disclosure marks the image. The first judgement result records whether the image is a defective image or a non-defective image. In some embodiments, the method for standardizing image annotation of the embodiment of the present disclosure is performed by an image-annotation technician (AT) operating a user interface, so that the computer in the production line can receive the first judgement result and the re judgement result, which are judged according to the defect pattern, at different points in time. In some embodiments, the AT is only responsible for the summary of image specification and the execution of image annotation, but does not participate in the formulation of image specification. Generally, the formulation of image specification is carried out by each unit in the factory based on product specification and production practices. For example, each unit in the factory may include product design engineers, process engineers, artificial intelligence R&D engineers, product assembly and test technicians, supplier management engineers, and quality engineers, but the present disclosure is not limited thereto. In some embodiments, the method for standardizing image annotation of the embodiment of the present disclosure is performed by one or more computers reading the defect profile in step S100, and determining whether the (input) image is a defective image according to the defect pattern in the defect profile.

When the AT encounters a product process specification change or dispute in determining whether the image is a defective image, the method for standardizing image annotation of the embodiment of the present disclosure may initiate a marking conference mechanism. The above-mentioned product design engineers, process engineers, artificial intelligence R&D engineers, product assembly and test technicians, supplier management engineers, and quality engineers discuss the controversial target feature images, and establish a specification version number for the conference result, so that the marking judgement standard (or marking standard) can be accurately adjusted. In some embodiments, if the target feature image is disputed in the marking conference, the method for standardizing image annotation of the embodiment of the present disclosure may perform the relevance analysis of the target feature image (depending on which defect the target feature image is associated with, the corresponding factory unit may perform the specification determination), and the product design engineers or the quality engineers participating in the marking conference may make a final conclusion based on the product specification. In some embodiments, if the image related to the defect of SMT placement is disputed, the SMT process engineers may make the specification determination. In some embodiments, the result of the marking conference may be updated to the defect profile, so that the defect pattern of the defective image can be updated synchronously.

In some embodiments, the method for standardizing image annotation of the embodiment of the present disclosure updates the defect pattern of the defective image and the specification version of the defect pattern by increasing or decreasing the number of images corresponding to at least one defect pattern, or by increasing or decreasing the number of types of defect patterns defined in the defect profile. For example, when an image is judged as the defect of component skew, the image may be added into the defect pattern of component skew (for example, storage in the folder of the defect pattern of component skew), and the image may be marked with the import date (for example, the date stored in the folder corresponding to the defect of component skew).

In some embodiments, in step S102, when a first image is judged as a defective image by the image-annotation technician (AT) at a time point C, the AT inputs the first judgement result to computers in the production line through a user interface. Therefore, the first judgement result may record that the first image is the defective image. When the same first image is judged as the non-defective image at a time point D, the re-judgement result may record that the first image is the non-defective image.

In step S102, when the re-judgement result at the time point D is the same as the first judgement result at the time point C (that is, when the first judgement result records that the first image is the defective image and the re judgement result records that the first image is also the defective image, or the first judgement result records that the first image is the non-defective image and the re-judgement result records that the first image is also the non-defective image), the method for standardizing image annotation of the embodiment of the present disclosure marks the first image. In some embodiments, the AT marks the first image through the user interface. In other words, the method for standardizing image annotation of the present disclosure finally determines that the image (for example, the first image) is the defective image or the non-defective image in step S102. In some embodiments, while receiving the re-judgement result in step S102 by the method for standardizing image annotation of the present disclosure, the marking ability of the image-annotation technician, or one or more computers is audited.

For example, an image-annotation technician A first determines that a second image is a defective image at a time point C according to the defect pattern defined in step S100. The image-annotation technician A inputs the judgement result of "the second image is the defective image" to the computers on production lines through the user interface. After that, in step S102, the image-annotation technician A re-judges the same second image again, and inputs the re-judgement result in the computers on production lines through the user interface. When the second image is also judged as the defective image in the re-judgement result, the method for standardizing image annotation of the embodiment of the present disclosure determines that the marking ability of the image-annotation technician A is qualified, and the image-annotation technician A may remain in the production lines. In contrast, when the image-annotation technician A judges in the step S102 that the second image is a non-defective image, that is the first judgement result is difference from the re-judgement result, the method for standardizing image annotation of the embodiment of the present disclosure determines that the marking ability of the image-annotation technician A is not qualified, and the image-annotation technician A may be asked to temporarily leave the production line.

Figure 2:
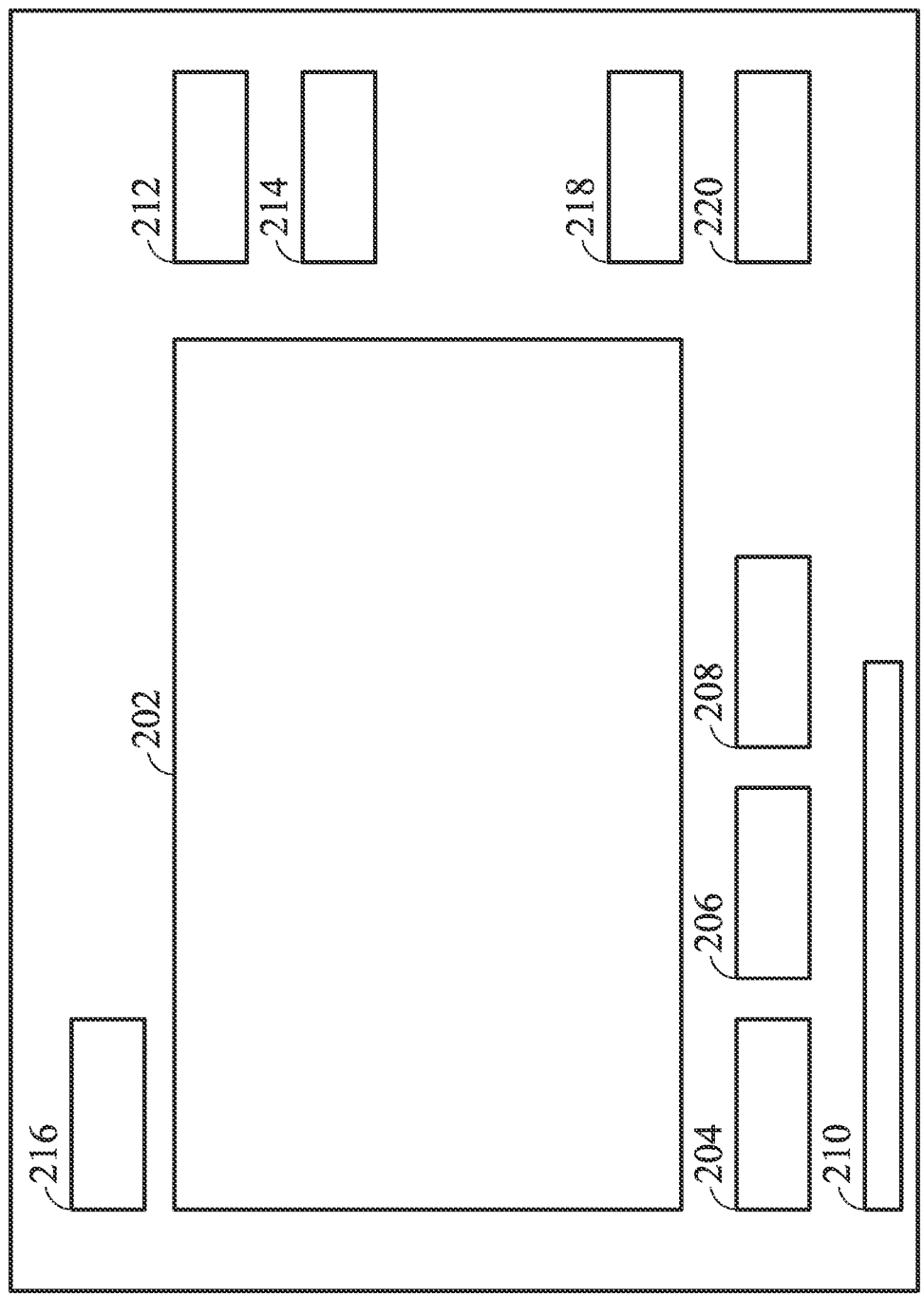
FIG. 2 is a schematic diagram of a user interface used in the method for standardizing image annotation in accordance with some embodiments of the disclosure.

FIG. 2 is a schematic diagram of a user interface (UI) used in the method for standardizing image annotation in accordance with some embodiments of the disclosure. The image-annotation technician A in the above embodiment operates the user interface as shown in FIG. 2 to mark the image as the defective image or the non-defective image, or to delete the image. As shown in FIG. 2, a user interface 200 can be displayed on a display screen connected to one or more computers in the production lines. In some embodiments, the user interface 200 can also be displayed on a mobile device carried by the image-annotation technician for marking different images at any time. The user interface 200 includes an image display 202, image annotation objects 204 and 206, an image deletion object 208, an image annotation display 210, an image loading object 212, an annotation completion object 214, an annotation progress display 216, a previous page object 218, and a next page object 220. In some embodiments, the image display 202 is used to display images (such as the above-mentioned first image, second image and third image). The image-annotation technician observes the defect pattern of the image through the image display 202, so that the image-annotation technician can mark the image according to the defect pattern of the image.

In some embodiments, the image annotation object 204 is used to mark the image displayed in real time in the image display 202 as a defective image, and the image annotation object 206 is used to mark the image displayed in real time in the image display 202 as a non-defective image. When the image-annotation technician presses the image annotation objects 204 and 206 in the user interface 20, the image in real time in the image display 202 is automatically stored in a storage space. For example, when a fourth image is displayed in the image display 202, the image-annotation technician presses the image annotation object 204, then, the fourth image is stored to a defect folder. The image-annotation technician presses the image annotation object 206, the fourth image is stored to a non-defect folder.

The image deletion object 208 is used to delete the image displayed in real time in the image display 202. For example, the image-annotation technician observes that the image displayed in real time in the image display 202 is not the image of the product produced in this production line. The image-annotation technician can delete the image displayed in real time in the image display 202 through the image deletion object 208. The image annotation display 210 can display the real time statistical number of defective images or non-defective images. In some embodiments, the image loading object 212 can read the image in the storage space and display the image in the image display 202. After the image-annotation technician has completed the annotation of all images, the annotation process can be ended by pressing the annotation completion object 214. For example, the image-annotation technician reads multiple images from a storage space (such as a folder) through the image loading object 212. The annotation progress display can display the number of images in the read folder and the number of images that have not been marked. In some embodiments, the image-annotation technician can switch the image displayed in real time in the image display 202 through the previous page object 218 and the next page object 220. The layout and functions of the user interface 200 of the method for standardizing image annotation of the embodiment of the present disclosure are only examples, and are not intended to limit the present disclosure.

In some embodiments, the method for standardizing image annotation of the present disclosure further audits a marking result of the image. When the image annotation operation is performed by an image-annotation technician, the marking result of the same image by the image-annotation technician may be affected by human nature and fluctuate, or the image itself has a highly controversial characteristic. If the highly controversial image is used as the training data of the image recognition algorithm in step S104, the judgement accuracy of the image recognition algorithm may be affected. Therefore, the method for standardizing image annotation of the present disclosure may audit the marking results from each image-annotation technician.

For example, the method for standardizing image annotation of the embodiment of the present disclosure audits the marking result of the image-annotation technician A. First, the image-annotation technician A may determine (for example, at a time point E) whether a fifth image in the plurality of images is a defective image (the first judgement), and output the judgement result to the computers in the production line through the user interface. The computers in the production line receive control signals from the user interface to obtain a first audit result. Then, the image-annotation technician A again determines (for example, at time point F) whether the fifth image in the plurality of images is a defective image (the second judgement), and outputs the judgement result to the computers in the production line through the user interface. The computers in the production line receive control signals from the user interface to obtain a second audit result. In other words, the method for standardizing image annotation of the present disclosure allows the same image-annotation technician to judge the same image at different points in time and compares these two audit results to see whether they are the same or not. In some embodiments, the first audit result and the second audit result record the number of defective images and non-defective images included in the same group of multiple images at different points in time (for example, time points E and F). when the ratio (also called the moving rate) of the difference between the first audit result and the second audit result is less than a first threshold, the method for standardizing image annotation of the present disclosure determines that the marking result by image-annotation technician A is qualified. In some embodiments, the first threshold is 20%. In some embodiments, the first threshold can be dynamically adjusted according to the comparison result (that is, comparing whether the first judgement result and the second judgement result are the same in step S106) of the first judgement result in step S102 and the second judgement result in step S104 in different previous tests, so as to effectively control the marking ability of the same image-annotation technician on the same image.

For example, the method for standardizing image annotation of the embodiment of the present disclosure audits 5643 images marked by the image-annotation technician A. according to the above-mentioned auditing steps, the method for standardizing image annotation of the present disclosure finds out that 508 images are non-defective images in the first judgement result, but are defective images in the second judgement result. Moreover, 1063 images are defective images in the first judgement, but are non-defective images in the second judgement. Therefore, the ratio of the difference between the first audit result and the second audit result is 27.84% ((508+1063)/5643=27.84%). Since 27.84% is greater than the first threshold (for example, 20%), the method for standardizing image annotation of the present disclosure determines that the marking result of the image-annotation technician A is unqualified. In some embodiments, when the marking result of the image-annotation technician A is unqualified, the image-annotation technician A may first leave the production line until the moving rate of the first audit result and the second audit result from the image-annotation technician A is less than 20%.

In some embodiments, the method for standardizing image annotation of the present disclosure allows different image-annotation technicians to judge the same multiple images to audit the marking results of different image-annotation technicians. For example, the image-annotation technician A judges whether a sixth image in a plurality of images is a defective image, and outputs the judgement result to the computers in the production line through the user interface. The computers in the production line receive control signals from the user interface to obtain a third audit result. An image-annotation technician B judges whether the sixth image in the plurality of images is the defective image, and outputs the judgement result to the computers in the production line through the user interface. The computers in the production line receive control signals from the user interface to obtain a fourth audit result. The method for standardizing image annotation of the present disclosure compares the third audit result and the fourth audit result. When the ratio of the difference between the third audit result and the fourth audit result is less than a second threshold, the method of the present disclosure determines that the image-annotation technician A and B are both qualified. In some embodiments, the second threshold is 5%. In some embodiments, the second threshold can be dynamically adjusted according to the comparison result (that is, comparing whether the first judgement result and the second judgement result are the same in step S106) of the first judgement result in step S102 and the second judgement result in step S104 in different previous tests, so as to effectively control the marking ability of the same image-annotation technician on the same image.

Figure 3:
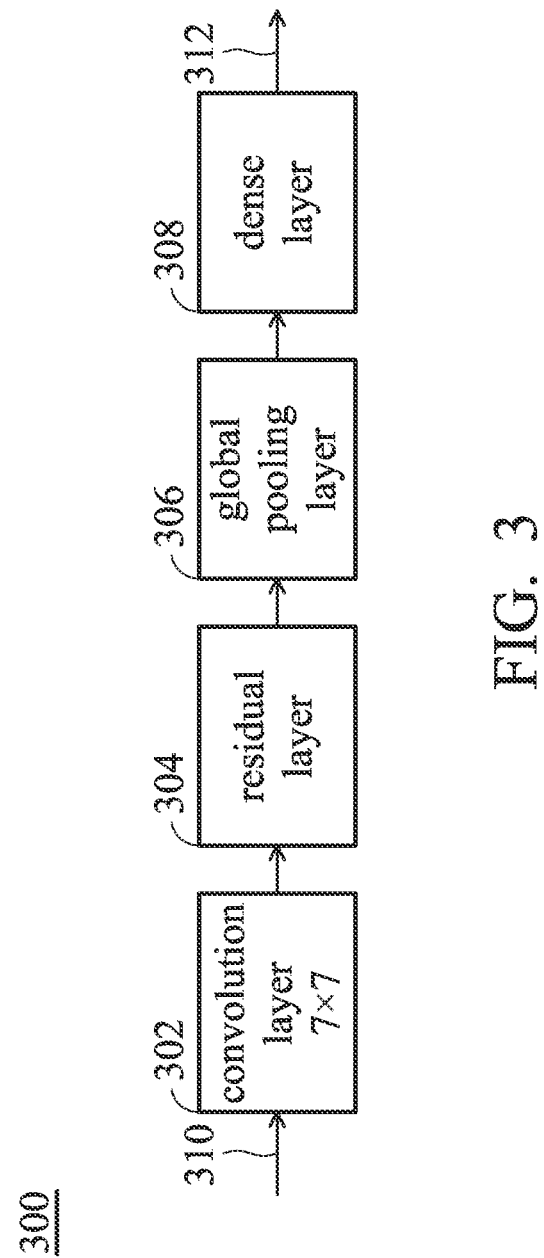
FIG. 3 is a schematic diagram of the structure of a deep residual network used in the method for standardizing image annotation in accordance with some embodiments of the disclosure.

Then, the method for standardizing image annotation of the present disclosure uses images (such as the first image, the second image, the third image, the fourth image, the fifth image, and sixth image described above) as training data to generate a trained image recognition algorithm. In some embodiments, the image recognition algorithm is a convolution neural network (CNN). In some embodiments, the convolution neural network is further a deep residual network (RestNet). FIG. 3 is a schematic diagram of the structure of a deep residual network used in the method for standardizing image annotation in accordance with some embodiments of the disclosure. As shown in FIG. 3, a deep residual network includes a convolution layer 302, a residual layer 304, a global pooling layer 306, and a dense layer 308. In some embodiments, the convolution layer 302 performs feature extraction on an image 310, which is input, through a 7*7 feature filter. Since the size of the feature filter of the convolution layer 302 is relatively large (for example, 7*7), the convolution layer 302 can extract local features of the image 310 and input the local features of the image 310 to a residual layer 304. In some embodiments, the residual layer 304 is formed by overlapping and connecting a plurality of convolution blocks and a plurality of identify blocks in series. In some embodiments, the image 310 may be a square image with a size of 224*224 or a rectangular image with a size of 336*112.

Figure 4:
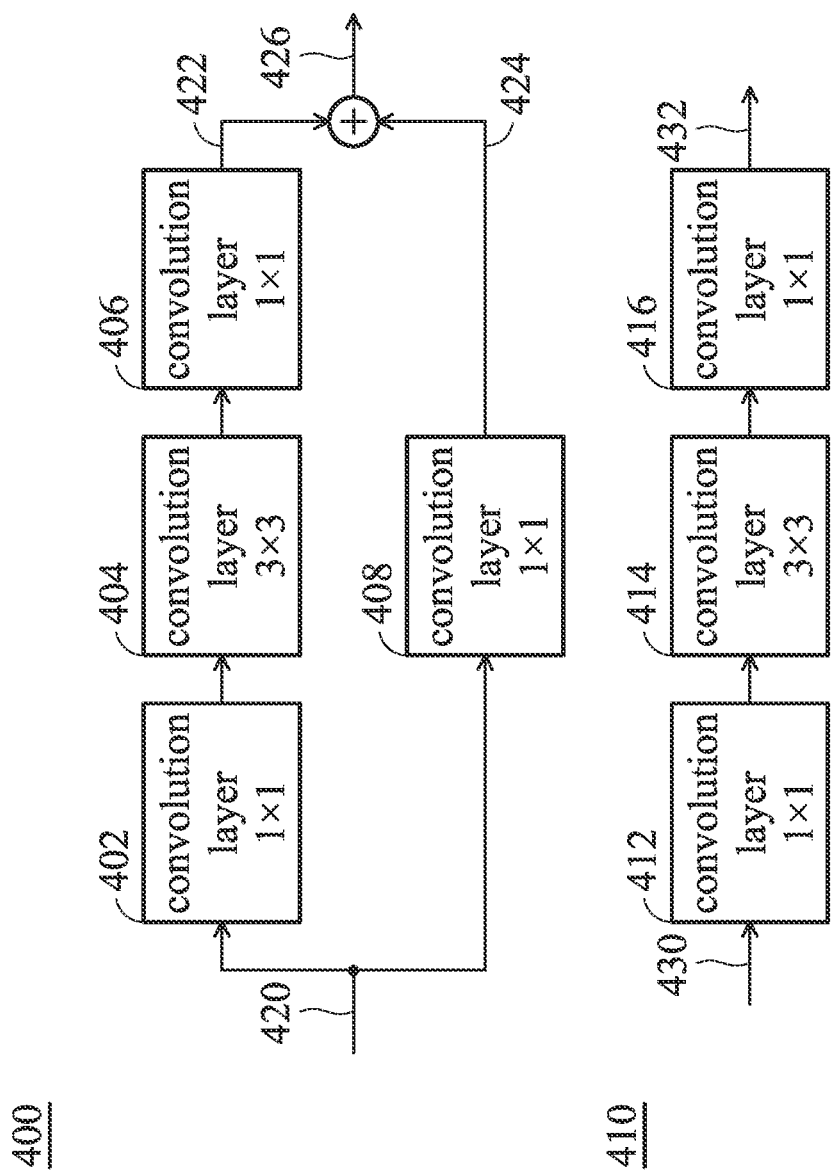
FIG. 4 is a schematic diagram of the structures of a convolution block and an identity block in the deep residual network used in the method for standardizing image annotation in accordance with some embodiments of the disclosure.

FIG. 4 is a schematic diagram of the structures of a convolution block 400 and an identity block 410 in the deep residual network used in the method for standardizing image annotation in accordance with some embodiments of the disclosure. As shown in FIG. 4, the convolution block 400 includes a convolution layer 402, a convolution layer 404, a convolution layer 406, and a convolution layer 408. The convolution layers 402, 406 and 408 have feature filters with a size of 1*1, and the convolution layer 404 has a feature filter with a size of 3*3 for extracting detailed features of a feature image 420. In some embodiments, the feature image 120 has the feature extracted from the image 310 in FIG. 3. The convolution layers 402, 404 and 406 perform feature extraction on the feature image 420 to generate a feature image 422. On the other hand, the convolution layer 408 performs feature extraction on the feature image 420 directly to generate a feature image 424. After that, the convolution block 400 overlaps the feature image 422 and the feature image 424 to generate a feature image 426, and outputs the feature image 426 to the next layer.

The identity block 410 includes a convolution layer 412, a convolution layer 414, and a convolution layer 416. The convolution layers 412 and 416 have feature filters with a size of 1*1, and the convolution layer 414 has a feature filter with a size of 3*3. In some embodiments, a feature image 430 has the feature extracted from the image 310 in FIG. 3. In some embodiments, the convolution layers 412, 414 and 416 perform feature extraction on the feature image 430 to generate a feature image 432. The identity block 410 outputs the feature image 432 to the next layer. In some embodiments, the feature image 432 is served as the final output of the residual layer 304, and is output to the global pooling layer 306 in FIG. 3. When the image 310 is a 224*224 square image, the global pooling layer 306 describes the image 310 with 1344 feature image values. When the image 310 is a 336*112 rectangular image, the global pooling layer 306 describes the image 310 with 2048 feature image values. In some embodiments, when the image is a 224*224 square image, the dense layer 308 uses 1344 feature image values to piece together the values corresponding to the defective image and the non-defective image to obtain a value 312.

Finally, the method for standardizing image annotation of the present disclosure uses a Softmax function to convert the value 312 into probability. For example, the value 312 can be expressed as (−2.6, 3.1), wherein −2.6 is the value that the deep residual network 300 judges the image 310 as a non-defective image, and 3.1 is the value that the deep residual network 300 judges the image 310 as a defective image. The method for standardizing image annotation of the present disclosure converts the value 312 to a probability (0.003, 0.997) by Softmax function. In other words, the probability of the deep residual network 300 judging the image 310 as a non-defective image is 0.3%, and the probability of the deep residual network 300 judging the image 310 as a defective image is 99.7%. Therefore, the deep residual network judges the image 310 as a defective image. The Softmax function is a generalization of logistic regression, so it is suitable for multiple classification problems, such as classifying images as defective images or non-defective images.

Returning back to FIG. 1, after the method for standardizing image annotation of the present disclosure uses the image (such as the above-mentioned marked first image, second image, third image, fourth image, fifth image, and sixth image, or the image 310 in FIG. 3) as training data to generate a trained convolution neural network (such as the deep residual network), in step S104, the method for standardizing image annotation of the present disclosure further uses a trained image recognition algorithm (for example, the convolution neural network) to judge whether the same image is a defective image to obtain a second judgement result. The method for standardizing image annotation of the present disclosure then, in step S106, compares the first judgement result in step S102 and the second judgement result in step S104, updates the defect profile in step S100 and the specification version of the defect pattern, and redefine the defect pattern of the defective image according to the first judgement result in step S102 and the second judgement result in step S104, so that the defect pattern can be standardized and have consistent standards. It is noted that the defect pattern of the defect profile received in step S100, the first judgement result received in step S102, and the comparison result of the first judgement result and the second judgement result in step S106 are all generated by the same object according to the same defect standard.

For example, the image-annotation technician B confirms the defect pattern and the defect standard of the image in the marking conference, and inputs the defect pattern to the computers in the production line inform of a defect profile through the user interface. After passing the marking ability audit (that is, the first judgement result in step S102 is the same as the re-judgment result), the image-annotation technician B judges an image according to the defect standard in the marking conference, and inputs the judgement result into the computers in the production line through the user interface to form the first judgment result in step S102. In step S108, the image-annotation technician B then confirms the comparison result of the first judgment result and the second judgement result in step S106 with the same defect standard. Therefore, because the defect pattern (or the defect profile) in step S100, the first judgement result in step S102, and the comparison result of the first judgement result and the second judgement result in step S106 are all generated by the image-annotation technician B according to the same defect standard defined in the marking conference, so that the annotation stability of the training data of the image recognition algorithm is improved, thereby improving the accuracy of image recognition of the trained image recognition algorithm.

For example, a seventh image is judged as a defective image in step S102, but is judged as a non-defective image in step S104. Therefore, the method for standardizing image annotation of the present disclosure may modify the specification setting of the defect pattern in the defect profile. For example, the method for standardizing image annotation of the present disclosure may increase or decrease the number of images corresponding to at least one defect pattern; or increase or decrease the number of types of defect patterns in the defect profile. In some embodiments, the seventh image is judged as the defective image in step S102, and is also judged as the defective image in step S104. Therefore, the method for standardizing image annotation of the present disclosure determines that the image recognition accuracy of the image recognition algorithm (such as the convolution neural network and the deep residual network 300) generated in step S104 is suitable for actual production lines. For example, the trained convolution neural network can be sent to the multiple computers in the production line through Internet.

Figure 5A:
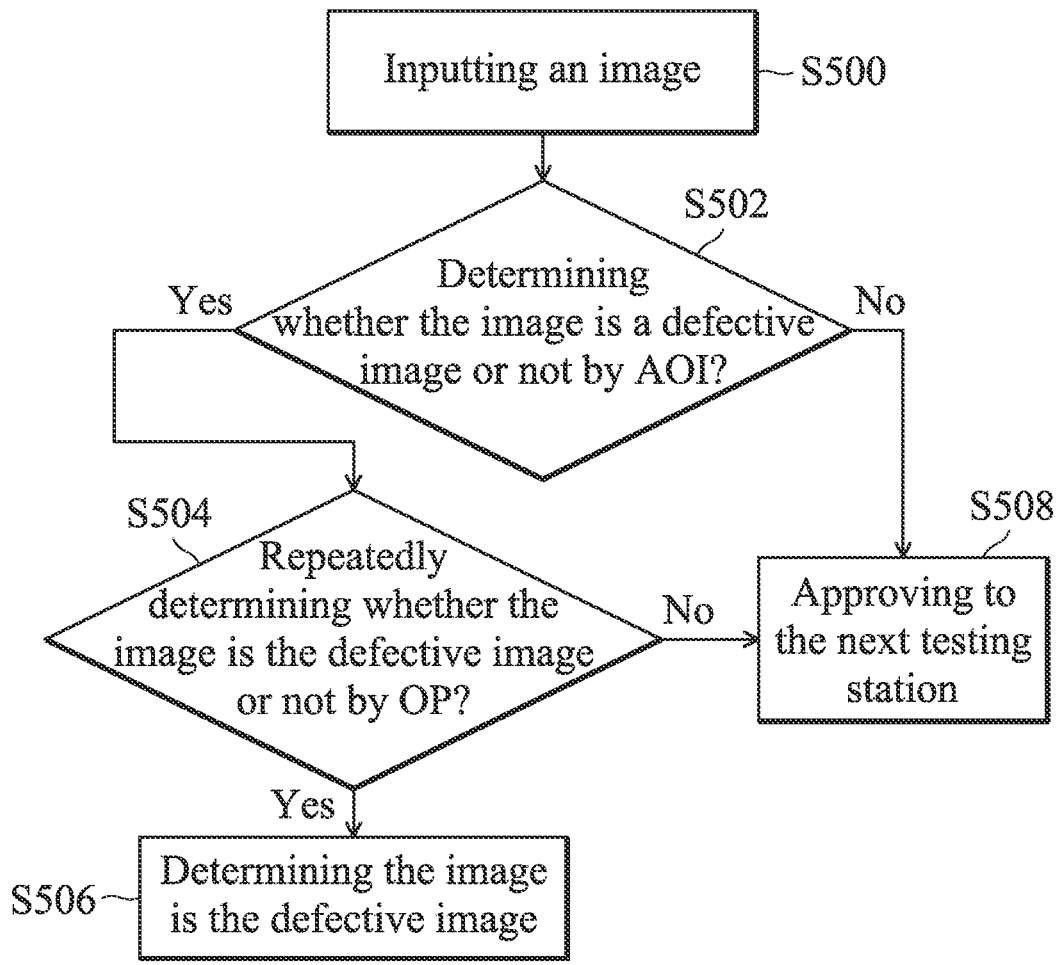
FIG. 5A is a flow chart of verification for a convolution neural network used in the method for standardizing image annotation in accordance with some embodiments of the disclosure.
Figure 5B:
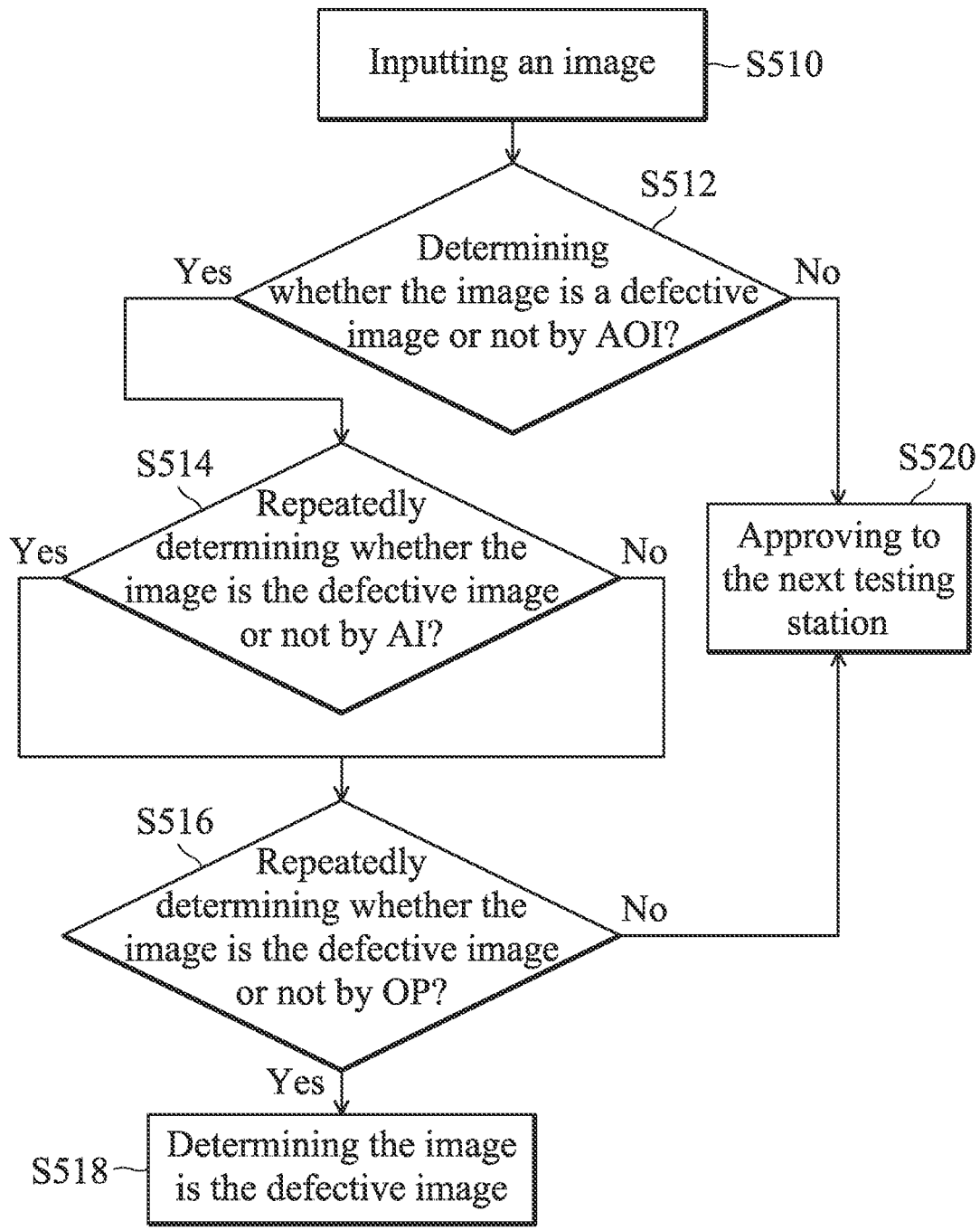
FIG. 5B is a flow chart of verification for a convolution neural network used in the method for standardizing image annotation in accordance with some embodiments of the disclosure.
Figure 5C:
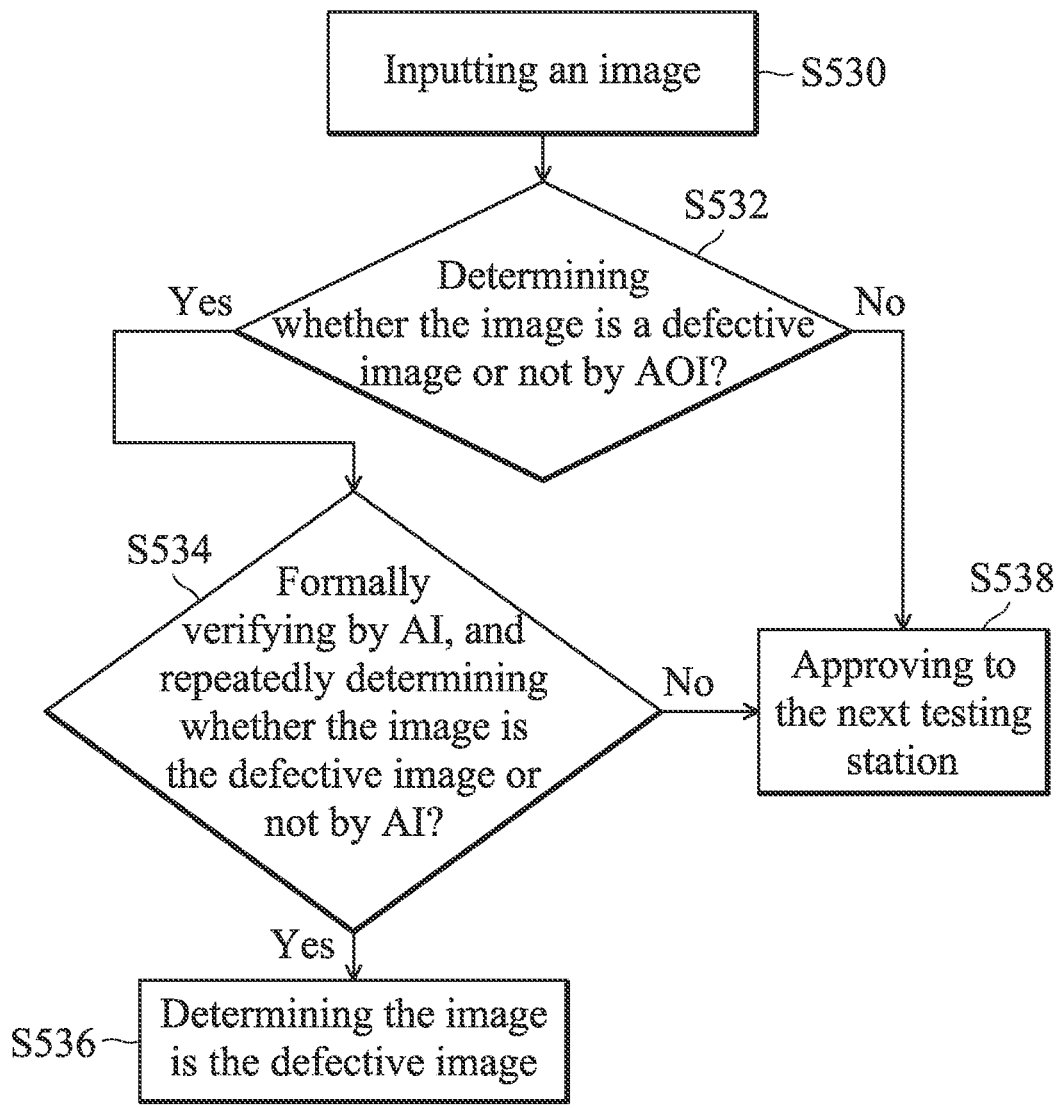
FIG. 5C is a flow chart of verification for a convolution neural network used in the method for standardizing image annotation in accordance with some embodiments of the disclosure.

FIGS. 5A, 5B and 5C are flow charts of verification for a convolution neural network used in the method for standardizing image annotation in accordance with some embodiments of the disclosure. In some embodiments, when the convolution neural network generated in step S104 is imported into the actual production lines, the products produced by the production line have entered a mass production stage. Therefore, when the convolution neural network (such as the deep residual network 300) is verified with images, the original operations of the production line must not be affected, and interference must not be imposed until the method for standardizing image annotation of the present disclosure has completed the verification of the convolution neural network. For example, FIG. 5A shows the verification method by full manual assistance.

As shown in FIG. 5A, in step S500, the method for standardizing image annotation of the present disclosure uses an automatic optical inspection (AOI) equipment to capture an image of the product produced in the production line. Then, the AOI equipment determines whether the image captured in step S502 is a defective image or not. When the AOI equipment determines that the image is a non-defective image, the method for standardizing image annotation of the present disclosure sends the product corresponding to the non-defective image to the next test station (for example, through the production line conveyor belt) (step S508). When the AOI equipment determines that the image is the defective image, the image-annotation technician repeatedly determines whether the image is the defective image in step S504.

If the image-annotation technician determines that the image is a defective image, the image-annotation technician inputs her judgement result to the computers in the production line through the user interface, so that the computers in the production line receive control signals from the user interface to confirm that the image is the defective image (step S506). The method for standardizing image annotation of the present disclosure can pick out the product corresponding to the defective image to repair the product. If the image-annotation technician determines that the image is a non-defective image, the image-annotation technician inputs her judgement result to the computers in the production line through the user interface, so that the computers in the production line receive control signals from the user interface to confirm that the image is the defective image (step S508). The method for standardizing image annotation of the present disclosure directly approves and sends the product corresponding to the non-defective image to the next test station. The verification method shown in FIG. 5A is the method before importing the convolution neural network for assisted verification.

FIG. 5B shows the verification method when the convolution neural network is imported for assisted verification. As shown in FIG. 5B, in step S510, the method for standardizing image annotation of the present disclosure uses an automatic optical inspection (AOI) equipment to capture an image of the product produced in the production line. Then, the AOI equipment determines whether the image captured in step S512 is a defective image or not. When the AOI equipment determines that the image is a non-defective image, the method for standardizing image annotation of the present disclosure sends the product corresponding to the non-defective image to the next test station (step S520). When the AOI equipment determines that the image is the defective image, the convolution neural network (CNN), which is a type of artificial intelligence (AI), repeatedly determines whether the image is the defective image in step S514.

Since the image recognition accuracy of the convolution neural network has not been confirmed in step S514, in FIG. 5B, no matter what the re-judgement result of the convolution neural network is, step S516 needs to be performed, and the image-annotation technician may re-judge the image again. When the image annotation still determines that the image is the defective image, the image-annotation technician inputs the judgment result to the computer in the production line through the user interface, so that the computers in the production line receives control signals from the user interface and conforms that the image is the defective image (step S518). The method for standardizing image annotation of the present disclosure can pick out the product corresponding to the defective image to repair the product. If the image-annotation technician determines that the image is the non-defective image, the image-annotation technician inputs her judgement result to the computer in the production line through the user interface, so that the computer in the production line receives control signals from the user interface and confirms that the image is the non-defective image, and step S520 is entered. The method for standardizing image annotation of the present disclosure directly sends the product corresponding to the non-defective image to the next test station.

FIG. 5C shows the verification method when the convolution neural network is imported for formal verification. In FIG. 5C, the method for standardizing image annotation of the present disclosure completely replaces manual verification with a trained convolution neural network. As shown in FIG. 5C, in step S530, the method for standardizing image annotation of the present disclosure uses an automatic optical inspection (AOI) equipment to capture an image of the product produced in the production line. Then, the AOI equipment determines whether the image captured in step S532 is a defective image or not. When the AOI equipment determines that the image is a non-defective image, the method for standardizing image annotation of the present disclosure sends the product corresponding to the non-defective image to the next test station (step S538). When the AOI equipment determines that the image is the defective image, a convolution neural network is used for formal verification, and the convolution neural network repeatedly determines whether the image is the defective image or not in step S534. The following sentences describe the difference between step S534 in FIG. 5C and step S514 in FIG. 5B. In step S514, since the image recognition accuracy of the convolution neural network has not been confirmed, in FIG. 5B no matter what the re-judgement result of the convolutional neural network is, step S516 needs to be performed, and the image-annotation technician re-judges the image again. However, in the step S534, the image recognition accuracy of the convolution neural network has been verified, thus the convolutional neural network can formally perform image recognition.

If the convolution neural network determines that the image is the defective image (step S536), the method for standardizing image annotation of the present disclosure can pick out the product corresponding to the defective image to repair the product. If the image-annotation technician determines that the image is the non-defective image, the method for standardizing image annotation of the present disclosure directly sends the product corresponding to the non-defective image to the next test station for subsequent testing.

Figure 6:
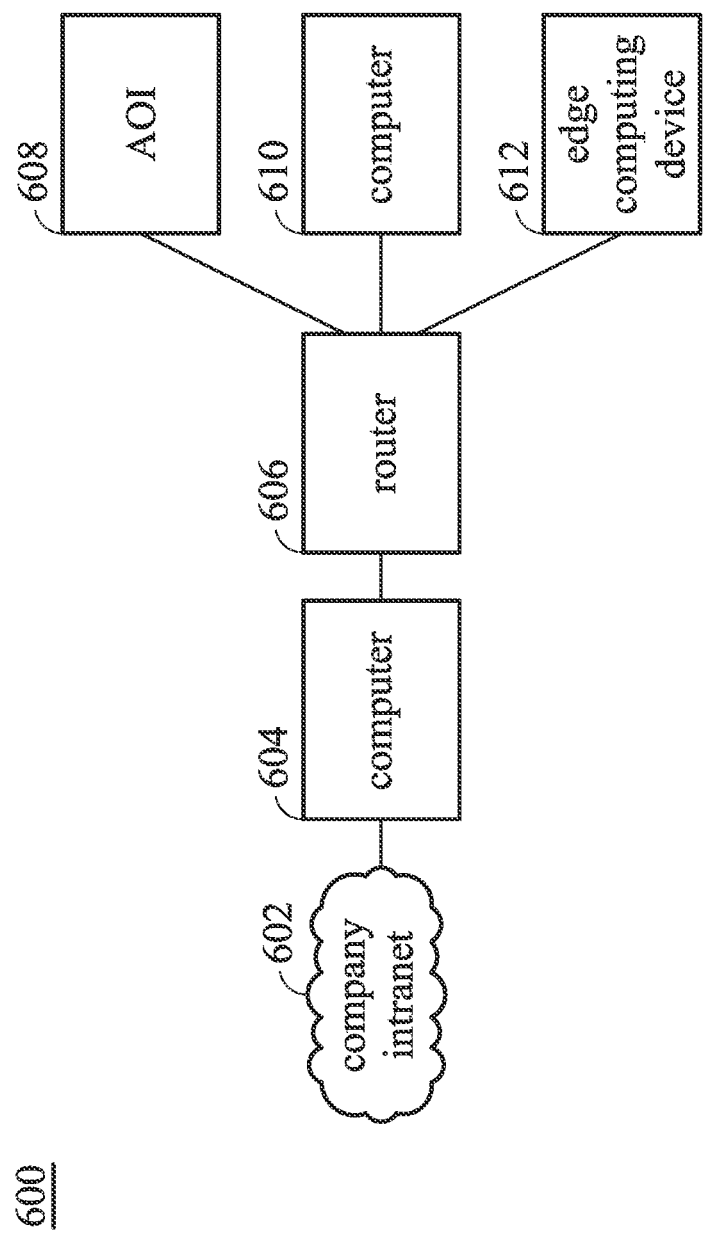
FIG. 6 is a configuration diagram of the method for standardizing image annotation applied to a production line in accordance with some embodiments of the disclosure.

FIG. 6 is a configuration diagram of the method for standardizing image annotation applied to a production line in accordance with some embodiments of the disclosure. As shown in FIG. 6, a production 600 is configured with a computer 604, a router 606, AOI equipment 608, a computer 610, and an edge computing device 612. The computer 604 is coupled between a company intranet 602 and the router 606, the router 606 is coupled between the computer 606 and the AOI equipment 608, between the computer 604 and the computer 610, and between the computer 604 and the edge computing device 612. The convolution neural network (such as the deep residual network 300) of the method for standardizing image annotation of the present disclosure is executed on the computer 610 and the edge computing device 612. The computer 610 and the edge computing device 612 obtain product images captured by the AOI equipment 608 through the router 606.

For example, when the computer 610 and the edge computing device 612 receive an eighth image from the AOI equipment 608 through the router 606, the computer 610 determines whether the eighth image is a defective image, and the eighth image is re-judged by the edge computing device 612. In some embodiments, the edge computing device 612 sends a re-judgement result of the eighth image to the computer 610 through the router, and the computer 610 marks the eighth image as a defective image or a non-defective image according to its own judgement result of the eighth image and the judgement result of the edge computing device 612. In addition, the computer 604 can integrate, by an edge computing method, the marking results of the eighth image by the computer 610 and the edge computing device 612 to a server (not shown) through the company intranet 602. In other words, the server can store (for example, in a defect profile) the defect patterns of the products produced by each production line. The production line configuration shown in FIG. 6 of the present disclosure is only an example, and the present disclosure is not limited thereto. The present disclosure can also user other production line configuration methods to achieve the effects of steps S100 to S108 in FIG. 1.

The present disclosure also discloses an electronic device for standardizing image annotation. The electronic device includes a user interface and a processor. In some embodiments, the user interface is configured to receive a defect pattern in step S100 in FIG. 1. Moreover, the user interface may receive a first judgement result generated by marking an image according to the defect pattern in step S102 in FIG. 1. In some embodiments, the processor may receive the defect pattern from the user interface, and also receive the first judgement result from the user interface. The processor may mark the image according to the defect pattern, and generate a second judgement result in step S104 in FIG. 1. The processer compares the first judgement result and the second judgement result to obtain a comparison result in step S106 in FIG. 1. Finally, the processor updates the defect pattern according to the comparison result to standardize the defect pattern (corresponding to step S108 in FIG. 1).

The present disclosure also discloses a computer program product for standardizing image annotation. The computer program product is suitable for a computer with a processor. The computer program product includes a first receiving instruction, a second receiving instruction, a judgement instruction, a comparison instruction, and a update instruction. When the processor of the computer executes the first receiving instruction, the processor receives a defect pattern in step S100 in FIG. 1. When the processor executes the second receiving instruction, the processor receives a first judgement result generated by marking an image according to the defect pattern in step S102 in FIG. 1. When the processor executes the judgement instruction, the processor marks the image to generate a second judgement result in step S104 and in FIG. 1. When the processor executes the comparison instruction, the processor compares the first judgement result and the second judgement result to obtain a comparison result in step S106 in FIG. 1. When the processor executes the update instruction, the processor updates the defect pattern according to the comparison result to standardize the defect pattern (corresponding to step S108 in FIG. 1).

Figure 7:
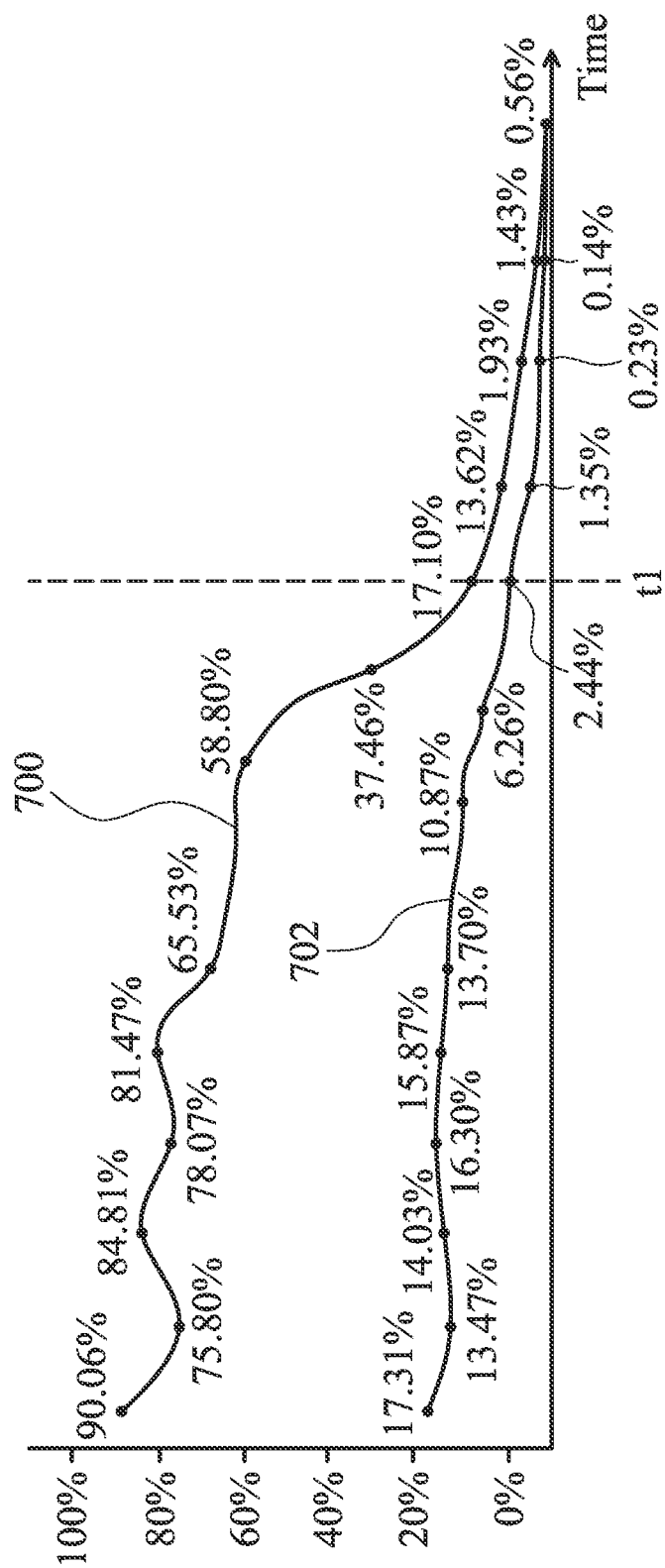
FIG. 7 is a curve graph of an overkill rate and a moving rate of the method for standardizing image annotation applied to the production line in accordance with some embodiments of the disclosure.

When the method for standardizing image annotation of the present disclosure is applied to an actual production line, the overkill rate and the leak rate can be effectively reduced during image recognition. In some embodiments, the overkill rate indicates a probability that the non-defective image is judged as the defective image. The leak rate indicates a probability that the defective image is judged as the non-defective image. FIG. 7 is a curve graph of an overkill rate and a moving rate of the method for standardizing image annotation applied to the production line in accordance with some embodiments of the disclosure. As shown in FIG. 7, a curve 700 is the re-judgement moving rate after the method for standardizing image annotation of the present disclosure is applied to the production line. A curve 702 is the product overkill rate after the method for standardizing image annotation of the present disclosure is applied to the production line. The time point when the method for standardizing image annotation of the present disclosure is applied to the actual production line is t1. According to the curves 700 and 702, it is clearly observed that after the time point t1, the re judgment moving rate drops to 17.10%, the product overkill rate drops to 2.44%, and the re-judgement moving rate and the product overkill rate continue to decrease after the time point t1. In other words, the method for standardizing image annotation of the present disclosure can effectively improve the overkill rate, the leak rate, and the re-judgement moving rate during the production of products on the production line, so that the production efficiency of the production line is more stable. The method for standardizing image annotation of the present disclosure can improve the marking stability of the training data of the trained convolution neural network, thereby improving the image recognition accuracy of the trained convolutional neural network.

FIGS. 8A and 8B schematic diagrams of defect patterns of the method for standardizing image annotation in accordance with some embodiments of the disclosure. Refer to FIG. 6 and FIGS. 8A and 8B at the same time. The computer 610 in FIG. 6 receives a total of 12 defect patterns belonging to the AOI test station. The 12 defect patterns includes (1) surface flatness, (2) poor link bar gap, (3) pin missing, (4) hook deformation, (5) hook broken, (6) snap broken, (7) poor link bar width, (8) hook not engaged, (9) snap not engaged, (10) missing link bar, (11) pin broken, and (12) edges or holes broken and blocked. The convolution neural network (for example, the deep residual network 300) of the method for standardizing image annotation of the present disclosure is executed on the computer 610 and the edge computing device 612.

For example, when the computer 610 determines that the images from the AOI equipment 608 matches the detect patterns (1) and (2), the computer 610 may generate the machine error codes of "FP Flatness" and "Link Bar Gap", and the above-mentioned machine error codes are the same as the preset specification error codes. Since the defect patterns (1) and (2) are set to not require re-judging, it is not necessary to go through the re-judgement of the edge computing device 612, and the method for standardizing image annotation of the present disclosure directly uses the judgement result of the computer 610. In some embodiments, when the computer 610 determines that the image from the AOI equipment 608 matches the defect pattern (3), the computer 610 may generate the machine error code "SC Pin Missing", and display the defect sub-pattern types on the display device of the computer 610 (for example, the user interface 200 in FIG. 2), such as 10 defect sub-patterns including "PIN-MISSING1", "PIN-MISSING2", . . . , "PIN-MISSING10". Since the defect patterns (3) is set to require re-judging, a re-judgement by the edge computing device 612 is still required, and when the judgement results of the computer 610 and the edge computing device 612 are the same, the method for standardizing image annotation of the present disclosure uses the judgment result of the computer 610.

Similarly, when the computer 610 determines that the image from the AOI equipment match the defect pattern (4), the computer 610 may generate the machine error code "FP Hook deformation", and display the defect sub-pattern types on the display device of the computer 610, such as 12 defect sub-patterns including "FP_DEFORMATION", "FP_DEFORMATION2", . . . , "FP_DEFORMATION6", "FP_WARP", "FP_WARP1", . . . , "FP_WARP5". When the computer 610 determines that the image from the AOI equipment match the defect pattern (5), the computer 610 may generate the machine error code "Hook Broken", and display the defect sub-pattern types on the display device of the computer 610, such as 7 defect sub-patterns including "HK_BROKEN1", "HK_BROKEN2", . . . , "HK_BROKEN7".

In some embodiments, when the computer 610 determines that the image from the AOI equipment match the defect pattern (6), the computer 610 may generate the machine error code "Snap Broken", and display the defect sub-pattern types on the display device of the computer 610, such as 8 defect sub-patterns including "SNAP-BROKEN", "SNAP-BROKEN1", "SNAP-BROKEN2" . . . , "SNAP-BROKEN7". When the computer 610 determines that the image from the AOI equipment match the defect pattern (7), the computer 610 may generate the machine error code "Link Bar Width Fail", and display the defect sub-pattern types on the display device of the computer 610, such as 6 defect sub-patterns including "LINK_BAR_WIDTH_RB", "LINK_BAR_WIDTH_LT", "LINK_BAR_WIDTH_LB", "LINK_BAR_WIDTH_RT", "LINK_BAR_WIDTH_1", and "LINK_BAR_WIDTH_2".

In some embodiments, when the computer 610 determines that the image from the AOI equipment match the defect pattern (8), the computer 610 may generate the machine error code "Hook not engaged", and display the defect sub-pattern types on the display device of the computer 610, such as 5 defect sub-patterns including "HOOK NOT ENGAGE", "HOOK NOT ENGAGE1", "HOOK NOT ENGAGE2", "HOOK NOT ENGAGE3", and "HOOK NOT ENGAGE4". When the computer 610 determines that the image from the AOI equipment match the defect pattern (9), the computer 610 may generate the machine error code "Snap not engaged", and display the defect sub-pattern types on the display device of the computer 610, such as 4 defect sub-patterns including "SNAP NOT ENGAGE", "SNAP NOT ENGAGE1", "SNAP NOT ENGAGE2", and "SNAP NOT ENGAGE3". When the computer 610 determines that the image from the AOI equipment match the defect pattern (10), the computer 610 may generate the machine error code "Link Bar Missing", and display the defect sub-pattern types on the display device of the computer 610, such as 3 defect sub-patterns including "LINK_BAR_MISSING", "LINK_BAR_MISSING1", and "LINK_BAR_MISSING2".

In some embodiments, when the computer 610 determines that the image from the AOI equipment match the defect pattern (11), the computer 610 may generate the machine error code "SC PIN Broken", and display the defect sub-pattern types on the display device of the computer 610, such as 5 defect sub-patterns including "PIN-BROKEN", "PIN-BROKEN2", "PIN-BROKEN3", "SC-PIN-BROKEN", and "SC-PIN-BROKEN1". When the computer 610 determines that the image from the AOI equipment match the defect pattern (12), the computer 610 may generate the machine error code "FP HOLE BROKEN", and display the defect sub-pattern types on the display device of the computer 610, such as 1 defect sub-patterns including "HOLE BROKEN". The method for standardizing image annotation of the present disclosure may learn the actual defect pattern of the image from the AOI equipment 608 through the information displayed in the test window in FIGS. 8A and 8B.

The ordinals in the specification and the claims of the present disclosure, such as "first", "second", "third", etc., have no sequential relationship, and are just for distinguishing between two different components with the same name. In the specification of the present disclosure, the word "couple" refers to any kind of direct or indirect electronic connection. The present disclosure is disclosed in the preferred embodiments as described above, however, the breadth and scope of the present disclosure should not be limited by any of the embodiments described above. Persons skilled in the art can make small changes and retouches without departing from the spirit and scope of the disclosure. The scope of the disclosure should be defined in accordance with the following claims and their equivalents.

What is claimed is:

1. A method for standardizing image annotation, comprising:
  receiving a defect pattern;
  marking an image according to the defect pattern to generate a first judgement result;
  marking the image according to the defect pattern to generate a second judgement result;
  comparing the first judgement result and the second judgement result to obtain a comparison result; and
  updating the defect pattern according to the comparison result to standardize the defect pattern, so that the second judgement result is approached to be the same as the first judgement result;
  receiving a first audit result and a second audit result at different time points; wherein the first audit result and the second audit result record a number of defective images or non-defective images comprised in the same group of images at different time points; and
  determining a marking result is qualified when a ratio of the difference between the first audit result and the second audit result is less than a first threshold, wherein the ratio of the difference is a moving rate;

wherein generating the second judgement result comprises:
generating an image recognition algorithm, which is trained using the image as training data; and
determining whether the image is a defective image by using the image recognition algorithm to obtain the second judgement result;
wherein the defect pattern is updated according to the comparison result to improve the accuracy of the image recognition algorithm.

2. The method for standardizing image annotation as claimed in claim 1, wherein marking the image comprises:
receiving a control signal from a user interface (UI); and
marking the image as a defective image or a non-defective image according to the control signal, or removing the image according to the control signal.

3. The method for standardizing image annotation as claimed in claim 2, wherein marking the image further comprises:
receiving the control signal from the user interface, and storing the image in a corresponding storage space according to the control signal.

4. The method for standardizing image annotation as claimed in claim 1, wherein generating the first judgement result comprises:
receiving the first judgement result and a re-judgement result for the image according to the defect pattern at different time points; and
marking the image according to the first judgement result when the re judgement result is the same as the first judgement result;
wherein the first judgement result records whether the image is a defective image or not.

5. The method for standardizing image annotation as claimed in claim 1, further comprising:
obtaining a specification version of the defect pattern;
wherein the specification version records an update date of the defect pattern.

6. The method for standardizing image annotation as claimed in claim 5, wherein updating the specification version of the defect pattern comprises:
increasing or decreasing a number of images corresponding to at least one defect pattern; or
increasing or decreasing a number of types of defect patterns in a defect profile.

7. The method for standardizing image annotation as claimed in claim 1, further comprising:
sending a convolution neural network, which is trained, to multiple computers in a production line through the internet when the second judgement result is the same as the first judgement result.

8. The method for standardizing image annotation as claimed in claim 7, wherein the convolution neural network is a deep residual network (RestNet).

9. An electronic device for standardizing image annotation, comprising:
a user interface, configured to receive a defect pattern, and to receive a first judgement result generated by marking an image according to the defect pattern; and
a processor, configured to receive the defect pattern and the first judgement result from the user interface, and to mark the image according to the defect pattern to generate a second judgement result;
wherein the processor compares the first judgement result and the second judgement result to obtain a comparison result; and the processor updates the defect pattern according to the comparison result to standardize the defect pattern, so that the second judgement result is approached to be the same as the first judgement result;
wherein the processor receives a first audit result and a second audit result at different time points, the first audit result and the second audit result record a number of defective images or non-defective images comprised in the same group of images at different time points;
the processor determines a marking result is qualified when a ratio of the difference between the first audit result and the second audit result is less than a first threshold, wherein the ratio of the difference is a moving rate;
wherein the processor performs an image recognition algorithm, which is trained using the image as training data, to determine whether the image is a defective image to obtain the second judgement result;
wherein the processor updates the defect pattern according to the comparison result to improve the accuracy of the image recognition algorithm.

10. A computer program product for standardizing image annotation, stored on a non-transitory computer-readable medium, suitable fora computer with a processor, comprising:
a first receiving instruction, configured to enable the processor to receive a defect pattern;
a second receiving instruction, configured to enable the processor to receive a first judgement result generated by marking an image according to the defect pattern;
a judgement instruction, configured to enable the processor to mark the image according to the defect pattern to generate a second judgement result;
a comparison instruction, configured to enable the processor to compare the first judgement result and the second judgement result to obtain a comparison result; and
an update instruction, configured to enable the processor to update the defect pattern according to the comparison result to standardize the defect pattern, so that the second judgement result is approached to be the same as the first judgement result;
a third receiving instruction, configured to enable the processor to receive a first audit result and a second audit result at different time points, the first audit result and the second audit result record a number of defective images or non-defective images comprised in the same group of images at different time points; and
a second judgement instruction, configured to enable the processor to determine a marking result is qualified when a ratio of the difference between the first audit result and the second audit result is less than a first threshold, wherein the ratio of the difference is a moving rate;
wherein the judgement instruction enables the processor to perform an image recognition algorithm, which is trained using the image as training data, to determine whether the image is a defective image to obtain the second judgement result;
wherein the update instruction enables the processor to update the defect pattern according to the comparison result to improve the accuracy of the image recognition algorithm.

* * * * *